United States Patent [19]

Bollen et al.

[11] Patent Number: 4,893,021

[45] Date of Patent: Jan. 9, 1990

[54] PROCESS FOR THE PRODUCTION OF MULTIPLE RADIOGRAPHIC IMAGES

[75] Inventors: Romain H. Bollen, Sint-Truiden; Raymond L. Florens, Edegem, both of Belgium

[73] Assignee: Agfa-Gevaert, N.V., Mortsel, Belgium

[21] Appl. No.: 141,766

[22] Filed: Jan. 11, 1988

[30] Foreign Application Priority Data

Jan. 27, 1987 [EP] European Pat. Off. ... EP87200119.3

[51] Int. Cl.$^4$ .............................................. G03B 42/04

[52] U.S. Cl. .................................. 250/487.1; 378/185

[58] Field of Search ............... 250/488.1, 487.1, 483.1; 378/185, 184

[56] References Cited

U.S. PATENT DOCUMENTS 4,195,228 3/1980 Rabatin ............................ 250/483.1
4,603,259 7/1986 Rabatin ............................ 250/483.1

FOREIGN PATENT DOCUMENTS 0098610 1/1984 European Pat. Off. ......... 250/487.1
59-225400 12/1984 Japan ............................... 250/483.1

OTHER PUBLICATIONS

Anonymous Disclosure 19931, "Arrangements for Producing X-Ray Images of Different Sensitometry Obtained with a Single Shot X-Ray Exposure", *Research Disclosure* No. 199 (Nov. 1980) pp. 508-509.

*Primary Examiner*—Constantine Hannaher
*Attorney, Agent, or Firm*—A. W. Breiner

[57] ABSTRACT

A process for the production of multiple radiographic images in which a corresponding number of photosensitive layers is exposed in a single shot to penetrating radiation and to photons emitted by fluorescent material sensitive to such penetrating radiation, characterized in that during such exposure each said photosensitive layer is located between a layer of said fluorescent material and a visible light reflecting layer which comprises white pigment particles and has a diffuse white light reflection density of less than 0.30.

26 Claims, 4 Drawing Sheets

PROCESS FOR THE PRODUCTION OF MULTIPLE RADIOGRAPHIC IMAGES

DESCRIPTION

1. FIELD OF THE INVENTION

This invention relates to a process for the production of multiple radiographic images in which a corresponding number of layers of photo-sensitive material are exposed in a single shot to penetrating radiation and to photons emitted by fluorescent material sensitive to such penetrating radiation. The invention includes a photographic film pack assembly comprising a plurality of layers of photo-sensitive material and a plurality of layers of fluorescent material sensitive to such penetrating radiation arranged so that each said photo-sensitive layer faces a said fluorescent layer.

2. BACKGROUND OF THE INVENTION

The term "radiography" denotes a recording technique which makes use of "penetrating radiation", and that expression denotes highly energetic radiation including X-rays, gamma-rays, beta-rays, fast electrons and neutrons. In conventional radiography, X-rays are used.

In conventional radiography, particularly in the medical field, most of the X-ray films which are used comprise a transparent film support coated on each of its faces with a silver halide emulsion layer. Such films are usually X-ray exposed in conjunction with X-ray conversion screens coated with a layer of fluorescent material which is sensitive to X-rays in that it re-radiates visible light and/or ultra-violet radiation when struck by X-rays. Such screens are also known as intensifying screens.

X-ray conversion screens are currently used for more than 90 per cent of medical radiographs, and they are also used, though to a more limited extent, in industrial radiography. Because they transform X-rays into visible light and/or ultra-violet radiation to which the silver halide is more sensitive, a considerable reduction can be made in the amount of penetrating radiation to which the film, and the patient, are exposed.

The use of so-called "X-ray paper" which is manufactured as a single side silver halide emulsion coated radiographic material has not found any significant commercial use despite its potential advantage in price. The gradation obtained with X-ray paper is fairly steep and the exposure latitude is rather narrow [see "Medical X-ray Technique—Principles and Applications" G. J. Van der Plaats (1959) Philips Technical Library, page 163]. As a result, X-ray paper does not have such diagnostic advantages for detailed examination as does the conventional film comprising a double silver halide coating on a transparent support.

While radiographic film and X-ray conversion screens have been improved over the years, there remains a continuing need to increase the information content of radiographic records without increasing the dosage of penetrating radiation.

A particular further desideratum is to have the possibility of better distinguishing detail in image areas corresponding to relatively X-ray opaque subject areas (e.g. bone) as well as in relatively X-ray transparent subject areas (e.g. soft tissue).

Various different measures have previously been proposed for improving the information content of radiographic records. Among these proposals are those set out in U.S. Pat. No. 3,734,735 and in "Research Disclosure", No. 12018 of Apr. 1974 and No. 19931 of Nov. 1980. In the last mentioned Research Disclosure is described the use of fluorescent screens of different emission power in combination with two silver halide emulsion layers. The silver halide emulsion layers may be of different speeds, and they may be coated on a single support or on two separate supports. A black paper may be located between the two silver halide emulsion layers to prevent fluorescent light from one screen from forming an unsharp image in the oppositely situated emulsion layer.

It is an object of the present invention to provide a new process for the single shot production of multiple radiographic images having high information content but with low dosage of penetrating radiation.

SUMMARY OF THE INVENTION

According to the present invention, there is provided a process for the production of multiple radiographic images in which a corresponding number of photo-sensitive layers is exposed in a single shot to penetrating radiation and to photons emitted by fluorescent material sensitive to such penetrating radiation, characterised in that during such exposure each said photo-sensitive layer is located between a layer of said fluorescent material and a visible light reflecting layer which comprises white pigment particles and has a diffuse white light reflection density of less than 0.30.

The present invention includes a radiographic film pack assembly comprising a plurality of photo-sensitive layers and a plurality of layers of fluorescent material sensitive to such penetrating radiation arranged so that each said photo-sensitive layer faces a said fluorescent layer, characterised in that each said photo-sensitive layer is located between a said fluorescent layer and a visible light reflecting layer which comprises white pigment particles and has a diffuse white light reflection density of less than 0.30, preferably less than 0.1.

References in this specification, including its claims, to measurements of diffuse reflection density are references to such measurements made in accordance with American Standards PH 2.17-1985.

The use of reflective layers has previously been described for increasing the photographic speed of single side coated photographic silver halide emulsion materials, see U.S. Pat. No. 3,615,443. The use of white pigment in the support composition itself, in combination with a black antihalation support layer has been described in U.S. Pat. No. 3,629,054. A photographic material comprising a silver halide emulsion layer on a polyester resin base containing surface treated titanium dioxide having an average particle size of 0.1 μm to 0.5 μm has been described in published EP-A 0 182 253. The adoption of such features in combination with a silver halide emulsion suitable for radiography, or for exposure in combination with a fluorescent screen has not been previously described or suggested.

The invention is most applicable for the production of a pair of radiographic images, which will be mirror images, and the remainder of this description will be worded as though there are only two images produced.

When using two fluorescent intensifying screens of same composition and structure in the process of the invention, the front screen, i.e. the screen located towards the X-ray source, will receive a higher exposure dose than the back screen because the X-rays are partly absorbed in the phosphor particles of the front screen and in the element(s) containing or coated with the light-reflecting pigment particles.

The "asymmetric" X-ray exposure of the screens results in an asymmetric exposure of the silver halide emulsion layers. This means that when a wedge type test object is used in the X-ray exposure the silver halide emulsion layer corresponding with the front screen yields on development an image of which the sensitometric curve defined by optical density (D) versus log exposure (log E) is shifted to lower log E values in comparison with the sensitometric curve obtained in the silver halide emulsion layer corresponding with the back screen. In other words, in the image obtained with the front screen exposure details, i.e. small density differences, can be perceived in the areas corresponding with the more X-ray opaque portions of the radiographed object, whereas with the back screen details can be perceived in the areas corresponding with the less X-ray opaque areas of the radiographed object.

The asymmetric exposure carried out by the process according to the present invention yields two images of which the total information content offers an increased perception of details (perceptibility) in comparison with the congruent single shot images obtained in a duplitized silver halide emulsion film having a transparent base.

Due to the presence of the visible light reflecting layer(s), fluorescent light from a screen is reflected back through the photo-sensitive layer, thus allowing lower doses of penetrating radiation to be used for a given sensitivity of photographic material.

During radiographic exposure applied according to the present invention operating with a substantially opaque layer between the radiographic photo-sensitive layers the phenomenon of cross-over is eliminated. Cross-over of light is characteristic of conventional radiography operating with a screen pair and double-side coated, i.e. duplitized, silver halide emulsion film having a transparent support. The light emitted by each of the screens penetrates to a considerable extent through the transparent film support and produces by light-scattering an unsharp image in the oppositely situated silver halide emulsion layer.

In some preferred embodiment of the invention, the visible light reflecting layer is constituted by a support for said photo-sensitive material, and a said support is coated with a said photo-sensitive layer on each of its faces and is held between front and rear fluorescent layers.

In an other preferred embodiment of the invention, a said support is coated with a said photo-sensitive layer on only one of its faces, the support being folded in two to form a double thickness of support between two outwardly facing photo-sensitive layers which are held between front and rear fluorescent layers.

In still an other preferred embodiment of the invention, two fluorescent layers carried by opposite faces of a light-opaque support are sandwiched between to said photo-sensitive layers, each carried by a said visible light reflecting support.

In yet a further preferred embodiment of the invention, each said photo-sensitive layer is carried by a light-transparent support and such supports are held between front and rear fluorescent layers with a said visible light reflecting layer sandwiched between such supports.

For maximum image sharpness, each said photo-sensitive layer should be in contact with a said fluorescent layer during exposure.

THE DRAWINGS

The present invention is illustrated by accompanying drawings including FIGS. 1 to 6.

The obtaining and evaluation of perceptibility curves is described by Romain Bollen in the book "The Physics of Medical Imaging: Recording System, Measurements and Techniques" Arthur G. Haus, Editor—The University of Texas System Cancer Center M. D. Anderson Hospital and Tumor Institute Houston, Tex.—Collected papers from the 1979 American Association of Physicists in Medicine Summer School "The Physics of Imaging: Recording System Measurements and Techniques" held at the University of North Carolina, Chapel Hill, N.C. July 22–28, 1979, pages 588–613—Published by the American Institute of Physics, Inc., 335 East 45 Street, New York, N.Y. 10017.

The FIGS. 3 to 6 represent different filmpack assemblies according to the invention which comprise combinations of X-ray conversion screens with photographic silver halide emulsion materials including or being associated with one or more light reflecting elements suited for use in the process of the present invention.

Figure 3:
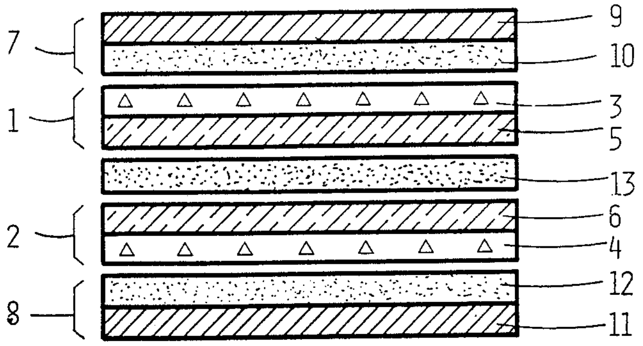

FIG. 3 illustrates a first mode for carrying out the process according to the present invention and proceeds with two single side coated photographic sheet materials 1 and 2 each containing a silver halide emulsion layer 3 and 4 of identical composition on transparent supports 5 and 6 respectively. During the X-ray exposure the silver halide emulsion layer 3 is held in contact, preferably in a cassette, with the front X-ray conversion screen 7, whereas silver halide emulsion layer 4 is held in contact with the back X-ray conversion screen 8. The screen 7 contains a resin support 9 and phosphor binder layer 10, whereas screen 8 contains a resin support 11 and phosphor binder layer 12. During the X-ray exposure a visible light reflecting sheet element 13 which contains, in a film forming resin binder, pigments that reflect white light is kept in intimate contact with said supports 5 and 6.

By said embodiment, in a single shot X-ray exposure, mirror images on transparent base materials are obtained that can be viewed in adjacency as transparencies on a classical viewing box for inspecting radiographs.

Figure 4:
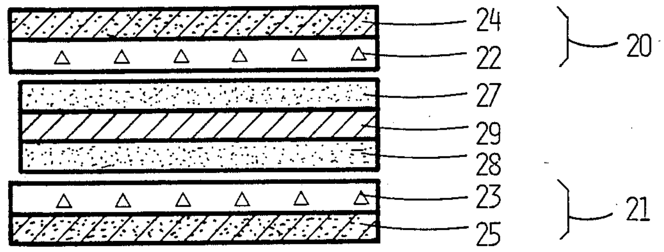

FIG. 4 illustrates a second mode for carrying out the process according to the present invention and proceeds with two single side coated photographic sheet materials 20 and 21 each containing respectively an identical silver halide emulsion layer 22 and 23 on resin supports 24 and 25 reflecting white light and containing dispersed white pigment particles. The film-screen assembly is kept in intimate contact during the single shot exposure, and is therefore applied preferably between pressure exerting cover members of a cassette, with the phosphor binder layers 27 and 28 doubleside coated on the same opaque screen support 29.

The developed images can be viewed with reflected light or projected in the reflection mode with an overhead projector.

Figure 5:
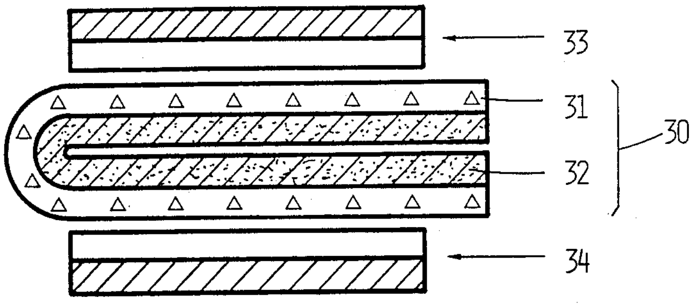

FIG. 5 illustrates a third embodiment for carrying out the process according to the present invention and proceeds with one single-side-coated photographic sheet material 30 that has been folded and contains a silver halide emulsion layer 31 on a paper support 32 containing dispersed white pigment particles in a sheet forming cellulose fiber mass. During X-ray exposure the photographic sheet material 30 as illustrated in the drawing is folded and stands between pressure exerting cassette cover members (not shown in the drawing), with one part of the silver halide emulsion layer 31 in contact with a front X-ray conversion screen 33 and with another part of said emulsion layer 31 in contact with a back X-ray conversion screen 34.

By said embodiment in a single shot X-ray exposure two adjacent mirror images on opaque white base are obtained that can be viewed in adjacency with reflected light or projected with an overhead projector capable of operating with opaque originals. In a variant, the sheet material 30 is cut along the fold line to give two separate sheets of single-side-coated photographic material.

Figure 6:
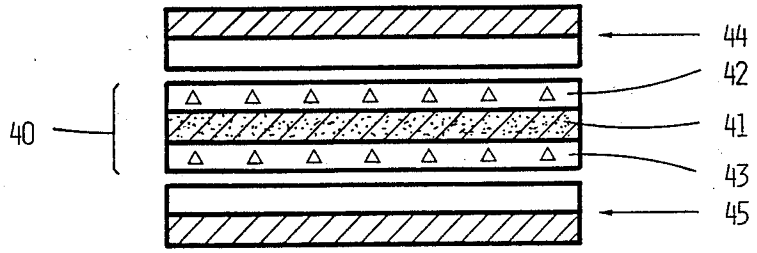

FIG. 6 illustrates a fourth embodiment for carrying out the process according to the present invention and proceeds with one single sheet photographic material 40 having identical doubleside coated silver halide emulsion layers 42 and 43 on a white light reflecting resin support 41. During the X-ray exposure the silver halide emulsion layer 42 is held in contact, preferably in cassette, with a front X-ray conversion screen 44, whereas silver halide emulsion layer 43 is held in contact with a back X-ray conversion screen 45.

By said embodiment in a single shot X-ray exposure two mirror images on a white light reflecting support are obtained that can be viewed separately, or simultaneously using mirror optics.

The white pigment particles present in the white-light-reflecting sheet element(s) applied in the process according to the present invention preferably not only reflect visible light but also have high absorption power with regard to X-rays. Preferred white pigment particles contain therefore chemical elements having an atomic number of at least 50, such as barium in the form of its sulphate. However, good results from the viewpoint of visible light reflection are likewise obtained with titanium dioxide. The titanium dioxide may be mixed with aluminium oxide or hydrated aluminium oxide to protect it from staining by processing chemicals as described in U.S. Pat. No. 3,928,037.

When applied in the hydrophobic resin binder of a film support the barium sulphate pigment is coated e.g. in a coverage of 30 $g/m^2$ to 60 $g/m^2$ and the titanium dioxide e.g. likewise in a coverage of 30 $g/m^2$ to 60 $g/m^2$. The same coverage values apply when incorporating said pigments in a hydrophilic binder layer or paper pulp mass.

The average grain size of said pigments is preferably in the range of 0.1 to 1 $\mu m$ and the pigment bulk includes preferably no particles whose size is larger than 50 $\mu m$.

PREFERRED EMBODIMENT IN RELATION TO SPECIFIC EXAMPLES

In a preferred embodiment a photogrpahic silver halide emulsion material used according to the present invention contains, e.g. in the support and/or in a hydrophilic layer of said material a substance fluorescing in the visible light spectrum when struck by ultra-violet radiation. Preferred fluorescent agents are so-called optical brightening agents. When containing optical brightening agents the photographic material having a reflecting image background by the presence of the white pigments offers a very contrasty and bright image under ultra-violet light viewing conditions. To have full benefit of the ultra-violet light viewing the white pigment has low ultra-violet light absorption so that barium sulphate is preferred over titanium dioxide that has a rather high ultra-violet light absorption power.

Particularly suited optical brightening agents are the anionic fluorescent compounds described in U.S. Pat. No. 3,269,840. They are applied in the paper mass of a paper support and/or in a hydrophilic colloid layer containing preferably polyvinyl pyrrolidone in order to enhance their brightening power and to prevent bleeding out of their host layer by rinsing. Other ultra-violet radiation absorbing substances that provide blue fluorescent light and that can be incorporated in a hydrophobic resin support are 2-quinolone compounds according to the following general formula:

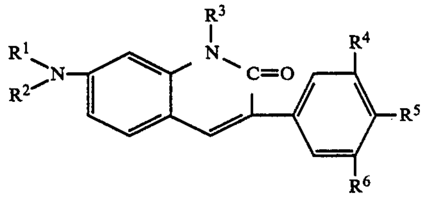

wherein:

each of $R^1$, $R^2$ and $R^3$, independently of each other, stands for an aliphatic hydrocarbon group or a substituted aliphatic hydrocarbon group, and each of $R^4$, $R^5$ and $R^6$, independently of each other, stands for hydrogen, alkyl, alkoxy or halogen.

Preferably the said aliphatic hydrocarbon group is a $C_1$–$C_5$ alkyl group particularly methyl or ethyl, an aralkyl group e.g. benzyl or a cycloalkyl group e.g. cyclohexyl.

Preferably the alkyl group of the said $R^4$, $R^5$ and/or $R^6$ group is a $C_1$–$C_5$ alkyl group.

Said compounds have been described in U.S. Pat. No. 3,849,658 as ultra-violet absorbing compounds for preventing "cross-over" of UV-radiation in duplitized X-ray film used in conjunction with UV-emitting intensifying screens.

A survey of optical brightening agents is given in the book "Fluorescent Whitening Agents"—Guest Editors: R. Anliker and G. Müller (1975) Georg Thieme Publishers Stuttgart—Distribution for America by Academic Press New York—San Francisco—London.

The photo-sensitive silver halide emulsions for use in the present invention may be coated on a wide variety of supports that have a diffuse reflection density as defined already above. The support may be a resin support, e.g. of cellulose nitrate, cellulose esters, polyvinyl acetal, polystyrene, polyethylene terephthalate and other polyester materials as well as Alpha-olefin-coated paper, e.g. paper coated with polyethylene or polypropylene incorporating white pigment particles to obtain said reflection density.

The supports used in the photographic materials according to the present invention may be coated with subbing layer(s) for improving the adhesion thereto of a gelatin-silver halide emulsion layer.

Suitable subbing layers are known to those skilled in the art of silver halide photography. With regard to the use of hydrophobic film supports reference is made to the composition of subbing layers described in the United Kingdom Pat. No. 1,234,755.

The support of a photographic material used according to the present invention is preferably a hydrophobic resin support having a thickness not larger than 250 μm and may incorporate the already defined white pigment particles. Polyethylene terephthalate resin supports incorporating said white pigment particles are manufactured by extrusion, whereas cellulose ester supports incorporating white pigment particles are manufactured usually by coating from an organic evaporatable solvent or solvent mixture.

The silver halide emulsion layer(s) may be coated with a thin protective layer, a so-called anti-stress layer, e.g. on the basis of more or less hardened gelatin.

For use in the process according to the present invention the silver halide of the silver halide emulsion layers may have a different grain size, spectral sensitivity and speed and the phosphors of the X-ray conversion screens may have a different emission power or may emit in a different spectral range optimizing with the spectral sensitivity of the silver halide emulsion layer with which they cooperate.

The colloid binder of the silver halide emulsion layers preferably consists essentially of gelatin.

Silver halide used in the photographic materials according to the present invention may be any type of photo-sensitive silver halide, e.g. silver bromide, silver chloride, silver chloroiodide, silver bromoiodide or silver chlorobromoiodide of mixtures thereof. The grain size is preferably in the range of 0.1 to 1.2 μm.

For example, silver halide emulsions are employed wherein the silver halide has a mean grain size smaller than 0.55 μm, and is a silver chlorobromide optionally containing up to 1 mole % of iodide.

A survey of the preparation and types of silver halide emulsions and their addenda used in radiographic materials is given in Research Disclosure Aug. 1979, item 18431.

The spectral sensitivity of the silver halide emulsions may be enlarged or improved with common spectrally sensitizing dyes, which include cyanine dyes and merocyanine dyes, as well as other dyes described by F. M. Hamer in "The cyanine dyes and related compounds", Interscience Publishers (1964). These dyes are preferably used in an amount in the range of 20 mg to 250 mg per mole of silver halide.

Silver halide emulsion layers of the material of the present invention may have the same or different spectral sensitivity.

According to one embodiment, green light emitting screens are used and the silver halide emulsion layers have been spectrally sensitized to green light.

The image-forming photo-sensitive silver halide grains may be chemically sensitized by any of the known procedures (see e.g. Photographic Emulsion Chemistry by G. F. Duffin, The Focal Press London and New York (1966) p. 83-98). The image-forming silver halide emulsions may be digested with naturally active gelatin or with small amounts of sulphur-containing compounds such as allyl thiocyanate, allyl-thiourea, sodium thiosulphate, etc. The image-forming emulsion may be sensitized likewise by means of reductors, e.g. tin compounds as described in the United Kingdom Pat. No. 789,823, polyamines e.g. diethyltriamine, and small amounts of noble metal compounds such as of gold, platinum, palladium, iridium, ruthenium, and rhodium as described by R. Koslowsky, Z. Wiss. Photogr. Photophys. Photochem. 46, 67–72 (1951). Representative examples of noble metal compounds are ammonium chloropalladate, potassium chloroplatinate, potassium chloroaurate and potassium aurithiocyanate.

Silver halide emulsion materials may contain in addition to the photo-sensitive chemically sensitized silver halide grains an amount of practically non-photo-sensitive silver chloride grains as described in the Belgian Pat. No. 777,581, and U.S. Pat. No. 3,820,991 for the purpose of speeding up colour processing at elevated temperature (at least 30° C.) when a colour coupler is used to form a dye image in conjunction with the silver image.

The amount of said silver chloride-containing emulsion with respect to the visible light-sensitive silver halide, expressed in equivalent parts by weight of silver nitrate, is preferably between 1:50 and 1:1. The practically non-photo-sensitive (i.e. non-chemically sensitized) silver chloride-containing emulsion is preferably a fine-grain silver chloride-containing emulsion having a particle size in the range from 0.05 to 0.5 μm, e.g. of a mean grain size of 0.22 μm. The sensitivity to blue light of said silver chloride emulsion is preferably 100 times smaller than the blue sensitivity of the chemically sensitized silver halide emulsion.

Emulsion stabilizers and antifoggants may be added to the silver halide emulsion, e.g., the known sulphinic and selenic acids or salts thereof, aliphatic, aromatic or heterocyclic mercapto compounds or disulphides, e.g. those described and claimed in published German patent application No. 2,100,622, preferably comprising sulpho groups or carboxyl groups, mercury compounds e.g. those described in Belgian Pat. Nos. 524,121, 677,337, 707,386 and 709,195 and tetra-azaindenes as described by Birr in Z. Wiss. Photogr. Photophys. Photochem. 47, 2–58 (1952), e.g. the hydroxytetra-azaindenes of the following general formula:

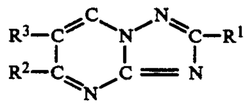

wherein each of $R^1$ and $R^2$ represents hydrogen, an alkyl, an aralkyl, or an aryl group, and $R^3$ represents hydrogen, an alkyl, a carboxy, or an alkoxy-carbonyl group, such as 5-methyl-7-hydroxy-s-triazolo[1.5-a]-pyrimidine.

Other additives may be present in one or more of the hydrophilic colloid layers of the radiation-sensitive silver halide elements of the present invention, e.g. hardening agents such as formaldehyde, dialdehydes, hydroxyaldehydes, mucochloric and mucobromic acid, acrolein, and glyoxal, mordanting agents for anionic colour couplers or dyes formed therefrom, plasticizers and coating aids e.g. saponin and dialkylsulphosuccinic acid salts such as sodium diisooctyl-sulphosuccinate, alkylarylpolyether sulphuric acids, alkylarylpolyethyl ether sulphonic acids, carboxyalkylated polyethylene glycol ethers or esters as described in French Pat. No. 1,537,417 such as iso-$C_8H_{17}$-$C_6H_4(OCH_2CH_2)_8OCH_2COONa$, fluorinated surfactants, e.g. those described in Belgian Pat. No. 742,680.

Development acceleration may be used either in the silver halide emulsion, in adjacent layer(s) or in the developing bath. They include alkylene oxide compounds of various types, e.g. alkylene oxide condensation products or polymers as described in U.S. Pat. Nos. 1,970,578, 2,240,472, 2,423,549, 2,441,389, 2,531,832, and 2,533,990; and in United Kingdm Pat. Nos. 920,637, 945,340, 991,608 and 1,015,023. Other development accelerating compounds are onium and polyonium compounds preferably of the ammonium, phosphonium, and sulphonium type, e.g. trialkyl sulphonium salts such as dimethyl-n-nonyl sulphonium p-toluene sulphonate, tetraalkyl ammonium salts such as dodecyl trimethyl ammonium o-toluene sulphonate, alkyl pyridinium and alkyl quinolinium salts such as 1-m-nitrobenzyl quinolinium chloride and 1-dodecylpyridinium chloride. bis-alkylene pyridinium salts such as N,N'-tetramethylene bispyridinium chloride, and quaternary ammonium and phosphonium polyoxyalkylene salts especially polyoxyalkylene bispyridinium salts, examples of which can be found in U.S. Pat. No. 2,944,900.

The radiographically exposed elements are preferably processed in an automatic processing apparatus for X-ray films in which the photographic material may be guided automatically and at a constant speed from one processing unit to the other, but it will be understood by those skilled in the art that the radiographic elements disclosed herein can also be processed apart from the above mentioned automatic processing apparatus in a variety of ways, such as by using the manual conventional multi-tank methods well known in the art.

In the radiographic exposure the photographic materials according to the present invention are preferably used in combination with fluorescent screen materials that include a phosphor, i.e. a fluorescent substance, that emits ultraviolet radiation and/or visible light when struck by penetrating radiation such as X-rays, gamma-rays, beta-rays, fast electrons such as produced in an electron microscope, fast protons or neutrons.

In order to provide fluorescent intensifying screens of different intensification power the screens may be composed with different phosphors or different mixtures of phosphors. Further the phosphor layers may be coated at different thickness or different content of screening dyes and anti-halation pigments, e.g. carbon black applied in anti-halation layer between the support and phosphor layer of the screen. According to another embodiment at least one of the fluorescent screens is provided with a reflective coating, e.g. a white pigment coating on the basis of titanium dioxide or a vacuum deposited reflective metal layer, e.g. an aluminium coating arranged between the phosphor layer and its support.

It is however an advantage, in order to avoid errors in screen positioning, that screens of same composition can be used for the asymmetric exposure of the photographic material according to the present invention.

Fluorescent screens that are particularly suited for use in combination with the photo-sensitive silver halide recording materials of the present invention have a phosphor layer whose intensification factor is at least twice as high as that of a calcium tungstate phosphor layer having substantial identity with regard to layer thickness, binder composition, phosphor particle size and phosphor content per sq.m and has a phosphor coverage of at least 100 $g/m^2$, preferably of 100 to 800 $g/m^2$.

By "intensification factor" is to be understood a factor measured at a pre-elected density D, indicating the exposure required to produce this density when the film is exposed to X-rays without intensifying screen, divided by the exposure required to produce the same density, e.g. density D—1.00, when the film is exposed with the screen, the wavelength distribution of the X-ray radiation and the conditions of developing being maintained constant.

Phosphors which are particularly suitable for use in high speed intensifying screens are those selected from fluorescent substances containing elements with atomic number 39 or 57 to 71, which include rare earth elements such as yttrium, gadolinium, lanthanum and cerium. Particularly suitable are the rare earth oxysulphide and oxyhalide fluorescing materials activated with other selected rare earths e.g. lanthanum and gadolinium oxybromide and oxychloride activated with terbium or dysprosium, and lanthanum and gadolinium oxysulphides activated with terbium, europium, or a mixture of europium and samarium. These rare earth fluorescent materials have been extensively described in the recent literature for which we refer, e.g., to German Pat. No. 1,282,819, French Pat. Nos. 1,580,544 and 2,021,397, French Patent of Addition 94,579 to 1,473,531, U.S. Pat. Nos. 3,546,128 and 3,725,704, also to K. A. Wickersheim et al "Rare Earth Oxysulphide X-ray Phosphors", in the proceedings of the IEEE Nuclear Science Symposium, San Francisco, Oct. 29–31, 1969, to S. P. Wang et al. IEEE Transactions on Nuclear Science, Feb. 1970, p. 49–56, and to R. A. Buchanan IEEE Transactions on Nuclear Science, Feb. 1972, p. 81–83. These rare earth photoluminescent materials, especially the gadolinium and lanthanum oxysulphides and oxyhalides activated with other selected rare earths e.g. erbium, terbium or dysprosium or with terbium and dysprosium, have a high X-ray "stopping power" or average absorption and high emission density and enable radiologists to use substantially lower X-ray dosage levels.

A survey of blue light and green light emitting phosphors is given in EP-A 0 088 820.

Particularly suited phosphors for use in the fluorescent intensification screens applied in the present invention correspond to the following general formula:

$$M_{w-n} \cdot M'_n O_w X$$

wherein:

M is at least one of the metals yttrium, lanthanum, gadolinium or lutetium,

M' is at least one of the rare earth metals dysprosium, erbium, europium, holmium, neodymium, praseodymium, samarium, terbium, thulium or ytterbium, X is sulphur or halogen, n is 0.0002 to 0.2, and w is 1 when X is halogen or is 2 when X is sulphur.

In combination with silver halide emulsion layers that are spectrally sensitized in the wavelength range of 450–570 nm preferably terbium-activated gadolinium or lanthanum oxysulphides having emission peaks at 490 and 540 nm and falling within the scope of the above general formula are used.

Another phosphor emitting in a range higher than 500 nm with emission maximum between 530 and 630 nm suited for use in a screen material of the present invention is represented by the following general formuls:

$$Y_{2-x}Tb_xO_2S$$

wherein: x is between 0.002 and 0.2. Phosphors according to this general formula are described, e.g., in U.K. Pat. No. 1,206,198 filed Mar. 28, 1968 by U.S. Phillips Corporation.

According to a preferred embodiment at least one of the fluorescent intensifying screens used in the radiographic exposure of the silver halide material contains a mixture of (A) yttrium oxysulphide activated with from 0.1 to 10% by weight of terbium or activated with terbium and dysprosium, and (B) gadolinium or lanthanum or lutetium oxysulphide activated with terbium or dysprosium. This mixed phosphor screen is particularly useful for its high visible light emission capacity.

A preferred ratio by weight of (A) and (B) is 25:75.

Other suitable intensification screens containing fluorescent materials that emit green (500–600 nm) light when exposed to cathode rays and X-ray radiations are described in United Kingdom Pat. No. 1,248,968.

Still other suitable phosphors for use according to the present invention in an X-ray fluorescent intensifying screen-film combination are represented by the following general formula:

$$La_{w-n}\cdot Tb_n{}^{-3}OX$$

wherein:
X is chlorine or bromine,
w is 1, and
n is 0.006 to 0.0001.

The halogen X is preferably present in an amount of about the stoichiometric amount, but may be present in lesser amount e.g. only about 2.5% of the stoichiometric amount.

Particularly strong blue light-emitting are lanthanum oxybromide phosphors that are activated with small amounts of terbium, e.g. wherein n is 0.002 and in which the ratio of gram atoms of oxygen to gram atoms of bromine is 1:1.

The preparation of terbium-activated lanthanum oxychloride and lanthanum oxybromide phosphors is described in the United Kingdom Pat. No. 1,247,602 and French Pat. Nos. 2,021,398 and 2,021,399, and published German patent application Nos. 1,952,812 and 2,161,958.

Particularly usefullanthanum oxyhalide phosphors are described in the published German patent application No. 2,161,958 mentioned hereinbefore corresponding with the Canadian Pat. No. 927,089. These phosphors are terbium- and ytterbium-activated lanthanum oxychlorides or lanthanum oxybromides corresponding to the following general formuls:

$$La_{1-w-y}OX{:}Tb_wYb_y$$

wherein:
X is chlorine or bromine,
w is from 0.0005 to 0.006 mole per mole of the oxyhalide, and is from 0.00005 to 0.005 mole per mole of the oxyhalide.

The presence of ytterbium strongly reduces the afterglow effect that follows the X-ray irradiation so that sharper images are obtained. The preparation of this class of phosphors has been described in the published German patent application No. 2,161,958 mentioned hereinbefore. Particularly interesting are said phosphors wherein w is 0.002.

The latter application teaches that LaOBR:Tb has an absorbing capacity for X-rays about 50% as high as calcium tungstate and an emission power in the blue light region 3 to 4 times as high as the usual calcium tungstate screens.

Another suitable lanthanum oxyhalide phosphor is a lanthanum oxychloride-fluoride phosphor as described in the published German patent application (DOS) No. 2,329,396.

An effective phosphor for use in X-ray intensifier screens that emits in the ultraviolet and blue light region is described in the published German patent application (DOS) No. 2,404, 422. Said phosphor has the formula $Y_{1-x}Gd_xPO_4{:}Tb^{3+}$ wherein x=0.3 to 0.1 and the terbium concentration is between about 0.008 and 0.012 mole per mole of phosphate.

Another ultra-violet light emitting X-ray conversion screen is e.g. based on a tantalate phosphor defined in EP-A 0 011 909.

By using a plurality of fluorescent screen layers of different composition or by using a fluorescent screen containing a mixture of different fluorescent substances a fluorescence over the whole visible spectrum can be obtained, so that such combination is particularly useful for recording with silver halide recording elements that have been made spectrally sensitive for light of the whole visible spectrum.

The fluorescent substance(s) is (are) in the form of a layer applied to a support, e.g. plastic film or cardboard, or applied as a self-supporting layer or sheet.

The thicker the fluorescent layer of the screen, the greater is its intensification. The size of the phosphor particles has also an influence in this respect: the larger the crystals, the more light they produce. Because a thick fluorescent layer and larger phosphor particles allow the light to spread more widely, the sharpness of the fluorescent image is decreased accordingly.

Suited screen layers or sheets have a thickness of preferably 0.05 to 0.5 mm and contain the fluorescent substance(s) or phosphors dispersed in a binder in an amount preferably of 80 to 95% by weight. Such binder is, e.g., an organic high molecular weight polymer. Suitable binding agents are, e.g., cellulose nitrate, ethylcellulose, cellulose acetate, polyvinyl acetate, polystyrene, polyvinyl butyral, polymethyl methacrylate and the like.

A preferred grain size of the fluorescent substances is in the range of about 1–25 $\mu$m. The phosphor coverage is preferbaly in the range of 100 to 800 g/m$^2$.

The surface of the fluorescent material layer may be protected against moisture and mechanical damage by a coating of an organic film-forming polymer applied to a thickness of 0.001 to 0.05 mm. Such protecting coating is, e.g., a thin film of cellulose nitrate, cellulose acetate, polymethyl methacrylate and the like.

According to a particular embodiment a protective overcoat is provided by a radiation-curable composition. Radiation-curing proceeds preferably with ultraviolet radiation in the wavelength range of 150 to 450 nm using monomers and/or prepolymers that can be polymerized by free-radical polymerization with the aid of a substance that produces free-radicals on UV irradiation. Such substance called photoinitiator may be selected from the group of benzoin ethers, benzil ketals, acetophenone derivatives, ketoxime esters, benzophenone and thioxanthone derivatives. The monomers and prepolymers are selected in order to provide a cross-linking reaction for forming a solvent-insoluble layer having good mechanical resistance. Suitable monomers for that purpose are e.g. hexane diol diacrylate, amino acrylate, silicone diacrylate, trimethylolpropane triacrylate, aliphatic and aromatic urethane acrylates and mixtures of these monomers. The monomeric products are preferably solvents for the prepolymers used. Suitable prepolymers are e.g. polyester acrylates and epoxy resin acrylates. In order to reduce the friction coefficient of the final coating the coating composition preferably contains a minor amount of silicone oil. The UV-curable composition can be used likewise as binder composition for the fluorescent substances in the phosphor coating of the X-ray conversion screen.

The following examples illustrate the present invention without, however, limiting it thereto. The percentages are by weight unless otherwise indicated.

EXAMPLE 1

In the present example 1 radiographic films of the structure and composition described hereinafter were exposed in a cassette with a pair of green light emitting X-ray conversion screens. In the radiographic exposure the following object (O) was used in contact with the front cover of the cassette directed to the X-ray radiation source.

(O) is a stepwedge of polymethylmethacrylate covered on each of its steps in the length of the steps with a row of glass beads of increasing size, viz. 0.2, 0.25, 0.3, 0.4, 0.6 and 1 mm diameter (D).

(A) Characteristics of the X-ray conversion screen.

A terbium-activated gadoliniumoxysulphide ($Gd_2O_2S:Tb$) phosphor prepared according to U.S. Pat. No. 3,515,675 was used in a binder layer on the basis of poly-n-butylmethacrylate at a phosphor coverage of 600 g/m$^2$ on a polyethylene terephthalate support.

The average particle size of the phosphor particles was 7 $\mu$m.

(B) Characteristics of the silver halide emulsion used in the radiographic films.

A silver bromoiodide emulsion (1.5 mole % of silver iodide) was prepared in such a way that it contained silver halide grains with an average grain size of 0.6 $\mu$m and comprised per kg an amount of silver halide corresponding to 190 g of silver nitrate and 74 g of gelatin. As stabilizing agents the emulsion contained per kg 545 mg of 5-methyl-7-hydroxy-5-triazolo[1,5-a]pyrimidine, 6.5 mg of 1-phenyl-5-mercaptotetrazole and 0.45 mg of mercury cyanide. The silver halide emulsion was spectrally sensitized to green light with 120 mg per mole of silver halide of a spectral sensitizing dye having the structural formula given in Example 1 of U.S. Pat. No. 4,130,428.

(C) Characteristics of radiographic material I used according to the present invention in the single shot exposure mode illustrated in FIG. 6.

The silver halide emulsion mentioned under (B) was coated on both sides of a double side subbed polyethylene terephthalate (PET) support having a thickness of 170 $\mu$m and containing 42 g/m$^2$ of $BaSO_4$ pigment particles having an average grain size of 0.3 $\mu$m per sq.m. The PET support had a diffuse reflection density of 0.02 and contained 2% by weight of an optical brightening agent having the following structural formula:

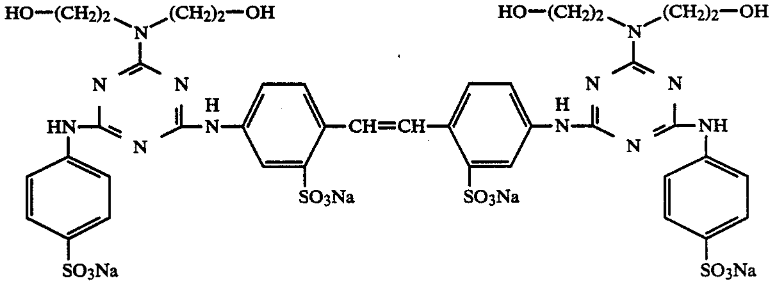

The coating proceeded in such a way that on each side of the support a silver halide emulsion layer was obtained containing an amount of silver halide equivalent to 6 g of silver nitrate per m$^2$. Each emulsion layer was coated with a gelatin protective layer (antistress layer) at a coverage of 1 g/m$^2$.

(D) Characteristics of radiographic material II used for comparative test purposes.

The radiographic material II had the same composition as radiographic material I with the difference that its support was a classical transparent blue-tinted polyethylene terephthalate base.

(E) X-ray exposure.

Both radiographic materials I and II were arranged in a cassette and exposed through the test object (O) using the above defined X-ray conversion screen as front and as back screen. In the exposure the X-ray tube was operated with a molybdenum anode at 28 kV using a 30 $\mu$m molybdenum filter. Radiographic material I was exposed with an X-ray exposure dose corresponding with only 360 mA.s, whereas radiographic material II was exposed with an exposure dose corresponding with 1200 mA.s in order to obtain a maximum density of practically same level as obtained in combining the two images of material I.

(F) Processing.

The exposed radiographic materials were developed, fixed and rinsed under identical conditions in an automatic 90 seconds processing machine, effecting the development for 23 seconds at 35° C. in a hardening developer containing hydroquinone and 1-phenyl-3-pyrazolidinone as developing agents and glutardialdehyde as gelatin hardening agent.

(G) Sensitometric results.

Figure 1:
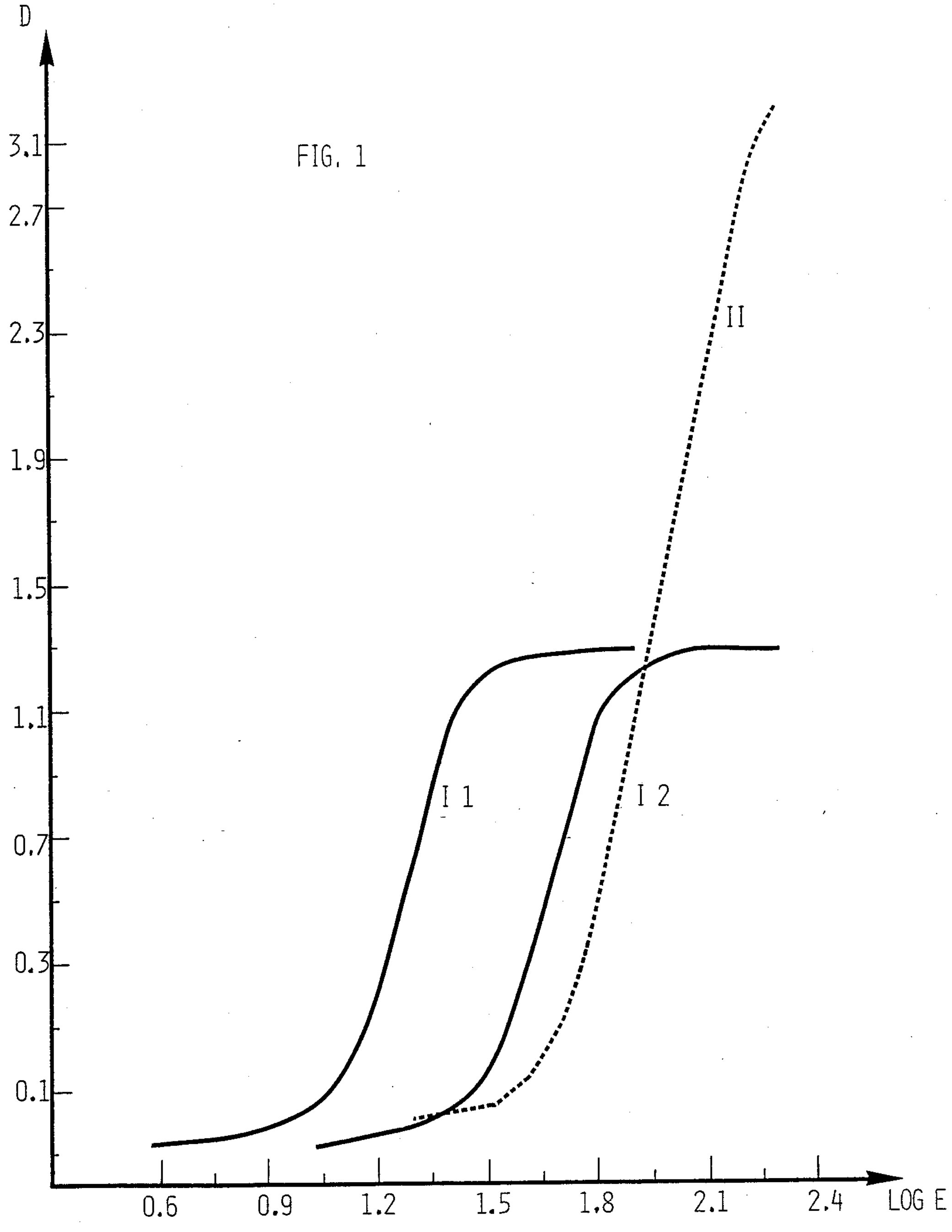
FIG. 1 shows sensitometric curves of optical density (D) versus log exposure (log E) obtained by exposure of silver halide emulsion layers separated by a visible light reflecting element as defined in Example 1, and of a comparative conventional duplitized transparent radiographic film.

From the images obtained with the exposure through the test wedge object (O), the density (D) versus relative log exposure (rel.log E) curves were determined (see FIG. 1).

The curves I1 and I2 obtained by measurement in the reflection mode relate to the front and back screen exposures respectively of radiographic material I.

The sensitometric curve II [(D) versus rel.log E] is obtained by measurement in the transmission mode and relates to the wedge image obtained in radiographic material II.

From the curves I1, I2 can be learned that radiographic material I used according to the present invention gives detectable information corresponding with the lower exposure doses (lower rel.log E values) of the object recorded in the silver halide emulsion layer contacting the front screen, whereas information corresponding with the higher exposure doses is recorded in the silver halide emulsion layer contacting the back screen.

From curve II can be learned that the classical radiographic material with transparent support gives detectable information corresponding approximately with the exposure dose recorded by silver halide emulsion layer I2 and higher exposure doses corresponding with higher density parts (D above 1.7) wherein the density differences are more difficult to discern.

When giving the radiographic material II arbitrarily the sensitivity value 100, the front-screen-exposed silver halide emulsion layer of radiographic material I had sensitivity value 330 and the back-screen-exposed silver halide emulsion layer had sensitivity value 132, the sensitivity values being relative log exposure values determined at optical density (D) 1.00 above fog.

Figure 2:
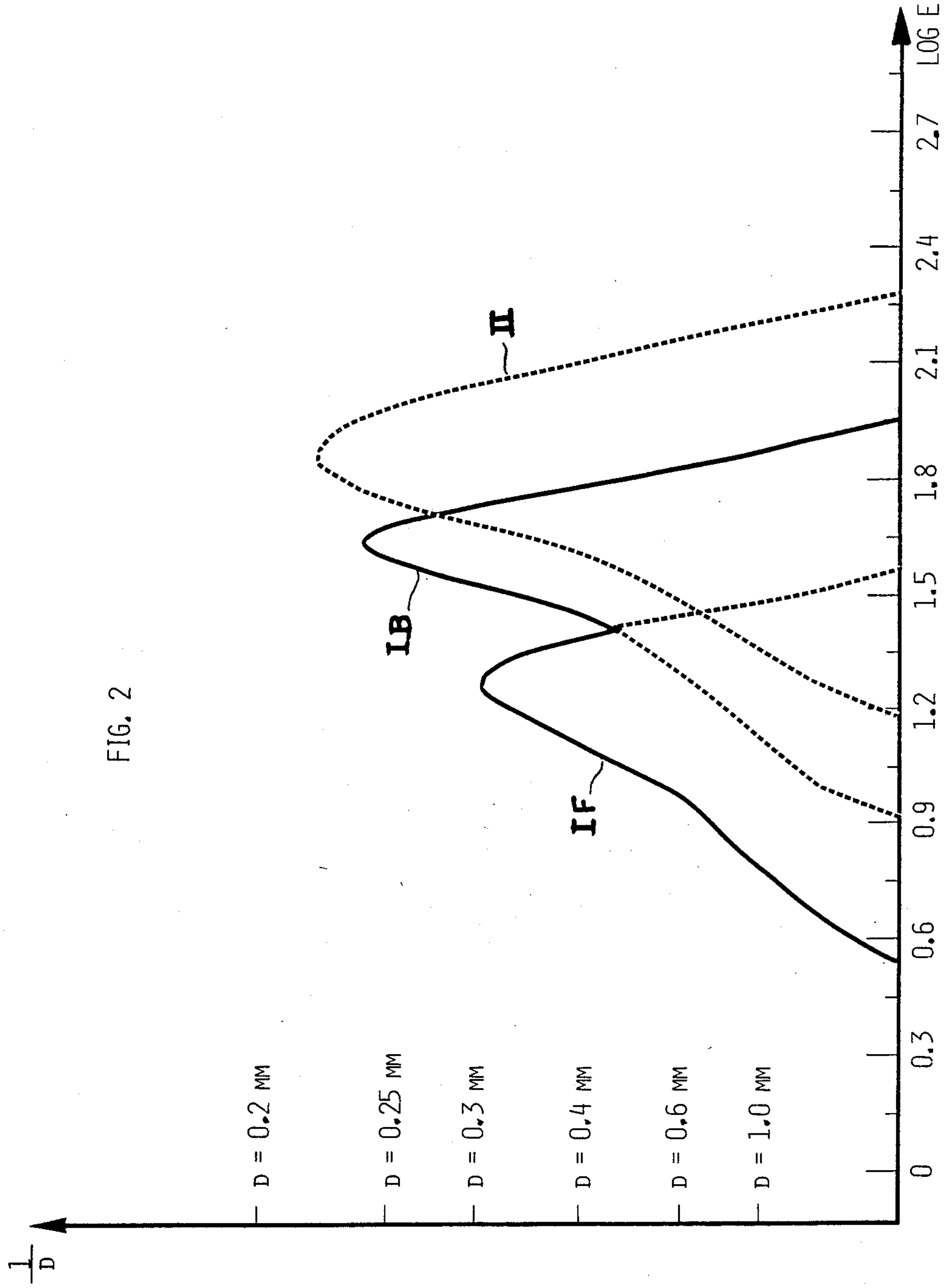
FIG. 2 shows comparative perceptibility curves obtained from the images produced by those exposures.

(H) Detail perceptibility results:

From the images obtained with the stepwedge (O) carrying on each step a row of glass beads of increasing size as defined hereinbefore peceptibility curves were determined as shown in FIG. 2.

The perceptibility curves shown in FIG. 2 were obtained by defining for each exposure level, i.e. log E value, the kind of beads (characterized by their diameter D) that are still perceivable and which not. In the diagram the reciprocal values (1/D) of the bead diameter D are put on the ordinate and on the abscissa increasing log E values corresponding with the different steps of the wedge are represented. The area within the perceptibility curve defines the information content of the image offered by the applied reproduction system. The larger the area above the abscissa covered by the perceptibility curve the larger the information content of the image.

In order to determine the perceptibility curve of each image the obtained wedge images IF and IB corresponding with the above defined front and back screen exposure of radiographic material I were submitted to a same person with normal vision capacity. Said person inspected the images for detail recognition (perception of the glass bead structures of different size against the background of each wedge step) with ultra-violet light in the reflection mode for the images IF and IB and for material II in the transmission mode with visible light on a common negatoscope.

From FIG. 2 can be learned that the total area covered by the partly overlapping curves IF and IB corresponding with the front and back screen exposure of the radiographic material I used according to the present invention is larger than the area covered by curve II corresponding with the image on radiographic material II obtained in the classical way on transparent base.

In agreement with said curves in the following Table 1 the perceptibility is expressed as the logarithmic value of the information range a range of log E values (Δlog E) wherein a particular glass bead size (diameter expressed in mm) against wedge step background can still be perceived and is given for the wedge image obtained in the transparent base film II, and the front and back screen images obtained in the radiographic film I. Due to the partial overlap of the perceptibility curves of the front and back screen images the combined perceptibility at a certain background density is lower than the sum of the Δlog E values at that density. From the obtained values can be learned that the total detail perception in the images resulting from the front screen and back screen exposures of radiographic material I used according to the present invention is larger than the detail perception obtained in the image viewed in transmission and obtained in classical radiographic material II.

TABLE 1

| Diameter mm | Transparent base film Δlog E | Reflective base film front Δlog E | back Δlog E | together Δlog E |
|---|---|---|---|---|
| 1.00 | 0.85 | 0.71 | 0.75 | 1.09 |
| 0.60 | 0.66 | 0.47 | 0.54 | 0.86 |
| 0.40 | 0.55 | 0.28 | 0.33 | 0.67 |
| 0.30 | 0.35 | — | 0.20 | 0.20 |
| 0.25 | 0.23 | — | 0.07 | 0.07 |
| 0.20 | — | — | — | — |

EXAMPLE 2

The reflective base film of Example 1 was used with the difference however, that the diffuse reflection density of the support of radiographic material I was 0.30.

The exposure of said modified radiographic material I, called here radiographic material Im, proceeded with an X-ray exposure dose corresponding with only 360 mA.s.

In the following Table 2 the perceptibility ranges corresponding with log E ranges wherein image marks of glass beads having a particular diameter on a stepwedge original defined as in Example 1 are listed for the radiographic materials II and Im.

In comparing the obtained values with those obtained with the classical radiographic material II of Example 1 it can be seen that for a smaller X-ray dose (360 mA.s against 450 mA.s for the transparent base film) the image detail perceptibility in the combination of front and back screen images obtained on the support with diffuse reflection density 0.30 is still larger for the coarser image details than obtained in the classical radiographic material II being a duplitized silver halide emulsion material having a transparent base.

TABLE 2

| Diameter mm | Material II front Δlog E | Material Im front Δlog E | back Δlog E | together Δlog E |
|---|---|---|---|---|
| 1.00 | 0.85 | 0.57 | 0.66 | 0.99 |
| 0.60 | 0.66 | 0.39 | 0.45 | 0.79 |
| 0.40 | 0.55 | 0.14 | 0.26 | 0.40 |
| 0.30 | 0.35 | — | 0.09 | 0.09 |
| 0.25 | 0.23 | — | — | — |

TABLE 2-continued

| | Material II | Material Im | | |
|---|---|---|---|---|
| Diameter mm | front Δlog E | front Δlog E | back Δlog E | together Δlog E |
| 0.20 | — | — | — | — |

We claim:

1. A process for the production of two radiographic images comprising the steps of providing two X-ray fluorescent screens, exposing said screens to a single shot X-ray exposure while each screen is associated with a photo-sensitive silver halide emulsion layer or silver halide emulsion layer part whereby said layer is exposed with the light emitted by the associated screen, and, during such exposure, locating said silver halide emulsion layer between a fluorescent layer of said X-ray fluorescent screen and a visible light reflecting layer which comprises white pigment particles and has a diffuse white reflection density of less than 0.30, in order that the latent silver images obtained in said silver halide emulsion layers or layer parts thereof are developed to form visible images.

2. A process according to claim 1, wherein the diffuse white light reflection density of said visible light reflecting layer is less than 0.10.

3. A process according to claim 1, wherein said pigment comprises particles of barium sulphate and/or titanium dioxide having an average grain size in the range 0.1 to 1 μm.

4. A process according to claim 3, wherein said particles are present in an amount between 30 and 60 $g/m^2$.

5. A process according to claim 1, wherein said photo-sensitive material contains a substance which fluoresces in the visible part of the spectrum when struck by ultra-violet light.

6. A process according to claim 1, wherein said visible light reflecting layer is constituted by a support for said photo-sensitive silver halide emulsion layer(s).

7. A process according to claim 6, wherein said support is coated with a photo-sensitive silver halide emulsion layer on each of its faces and is held between front and rear fluorescent screens.

8. A process according to claim 6, wherein said support is coated with a same silver halide emulsion layer on only one of its faces, the support being folded in two to form a double thickness of support between two outwardly facing silver halide emulsion layer parts which are held between front and rear fluorescent screens.

9. A process according to claim 6, wherein fluorescent screen layers carried by opposite faces of a light-opaque support are sandwiched between two said silver halide emulsion layers, each carried by a said visible light reflecting support.

10. A process according to claim 1, wherein each said silver halide emulsion layer is carried by a light transparent support and such supports are held between front and rear fluorescent layers with a said visible light reflecting layer sandwiched between such supports.

11. A process according to claim 1 utilizing silver halide emulsion layers and wherein said silver halide emulsion layers are substantially identical to one another.

12. A process according to claim 1 utilizing silver halide emulsion layers and wherein said silver halide emulsion layer during the exposure are in contact with a fluorescent layer of said fluorescent screens.

13. A radiographic film pack assembly comprising a plurality of photo-sensitive layers and a plurality of layers of fluorescent material sensitive to penetrating radiation arranged so that each said photo-sensitive layer faces a said fluorescent layer, characterised in that each said photo-sensitive layer is located between a said fluorescent layer and a visible light reflecting layer which comprises white pigment particles and has a diffuse white light reflection density of less than 0.30.

14. An assembly according to claim 13, wherein the diffuse white light reflection density of the or each said visible light reflecting layer is less than 0.10.

15. An assembly according to claim 13, wherein said pigment comprises particles of barium sulphate and/or titanium dioxide having an average grain size in the range 0.1 to 1 μm.

16. An assembly according to claim 15, wherein said particles are present in an amount between 30 and 60 $g/m^2$.

17. An assembly according to claim 13, wherein said photo-sensitive material contains a substance which fluoresces in the visible part of the spectrum when struck by ultra-violet light.

18. An assembly according to claim 13, wherein said photo-sensitive layer is a silver halide emulsion layer.

19. An assembly according to claim 13, wherein said visible light reflecting layer is constituted by a support for said photo-sensitive layer.

20. An assembly according to claim 19, wherein a said support is coated with a said photo-sensitive layer on each of its faces and is held between front and rear fluorescent layers.

21. An assembly according to claim 19, wherein said support is coated with a said photo-sensitive layer on only one of its faces, the support being folded in two to form a double thickness of support between two outwardly facing photo-sensitive layers which are held between front and rear fluorescent layers.

22. An assembly according to claim 19, wherein two fluorescent layers carried by opposite faces of a light-opaque support are sandwiched between two said photo-sensitive layers, each carried by a said visible light reflecting support.

23. An assembly according to claim 13, wherein each said photo-sensitive layer is carried by a light transparent support and such supports are held between front and rear fluorescent layers with a said visible light reflecting layer sandwiched between such supports.

24. An assembly according to claim 13, wherein said photo-sensitive layers are substantially identical to one another.

25. An assembly according to claim 13, wherein each said photo-sensitive layer is in contact with a said fluorescent layer.

26. An assembly according to claim 25, wherein at least one light-opaque layer is present between the or each pair of successive photo-sensitive layers.

* * * * *